US012188649B1

(12) United States Patent
Jankovsky et al.

(10) Patent No.: US 12,188,649 B1
(45) Date of Patent: Jan. 7, 2025

(54) LIGHTING ELEMENT

(71) Applicant: Crenshaw Lighting LLC, Floyd, VA (US)

(72) Inventors: Lucas Jankovsky, Floyd, VA (US); Matthew Vest, Floyd, VA (US)

(73) Assignee: Crenshaw Lighting LLC, Floyd, VA (US)

( * ) Notice: Subject to any disclaimer, the term of this patent is extended or adjusted under 35 U.S.C. 154(b) by 0 days.

(21) Appl. No.: 18/658,388

(22) Filed: May 8, 2024

Related U.S. Application Data

(60) Provisional application No. 63/602,894, filed on Nov. 27, 2023.

(51) Int. Cl.
*F21S 8/00* (2006.01)
*F21V 3/02* (2006.01)
*F21V 3/04* (2018.01)
*F21Y 115/15* (2016.01)

(52) U.S. Cl.
CPC ................ *F21V 3/049* (2013.01); *F21S 8/03* (2013.01); *F21V 3/02* (2013.01); *F21Y 2115/15* (2016.08)

(58) Field of Classification Search
CPC .................................... F21S 8/03; F21V 3/02
See application file for complete search history.

(56) References Cited

U.S. PATENT DOCUMENTS 3,868,501 A 2/1975 Barbour
6,000,812 A 12/1999 Freeman et al.
6,119,382 A 9/2000 Hakkert
6,220,723 B1 4/2001 Freeman et al.
6,280,054 B1 8/2001 Cassarly et al.
8,733,001 B2 5/2014 Gallet
10,492,263 B2 11/2019 Miller et al.
2008/0304250 A1 12/2008 Harbers et al.
2009/0002986 A1 1/2009 Medendorp, Jr. et al.
2009/0015930 A1 1/2009 Hikmet et al.
2010/0172152 A1 7/2010 Boonekamp
2010/0220497 A1 9/2010 Ngai
2012/0236586 A1 9/2012 Wang
2012/0250322 A1 10/2012 Dreeben et al.
2012/0281407 A1 11/2012 Sinofsky
2012/0327651 A1 12/2012 Cornelssen et al.
2013/0188347 A1* 7/2013 Bryan ..................... F21K 9/232
362/235
2013/0258652 A1 10/2013 Hsieh et al.
2013/0301249 A1 11/2013 Ngai et al.
2016/0369972 A1 12/2016 Thijssen et al.
2017/0370554 A1 12/2017 MacKinnon et al.
2018/0202629 A1 7/2018 Takeshita
2018/0259141 A1 9/2018 Yamaguchi et al.
2018/0335188 A1 11/2018 Di Trapani et al.
2019/0032872 A1 1/2019 Crosby et al.
2019/0181545 A1 6/2019 Lu
(Continued)

*Primary Examiner* — Fatima N Farokhrooz
(74) *Attorney, Agent, or Firm* — Thompson Coburn LLP

(57) ABSTRACT

A lighting element comprising a forward member. The forward member comprises a non-wood material. The forward member has a forward member front surface. The forward member may have a plurality of ridges and valleys shaped to have the appearance of wood that has been abraded in a media blasting process. The lighting element may be capable of projecting beams of light onto a wall or ceiling to create a light pattern comprising a plurality of different intensities of light.

30 Claims, 15 Drawing Sheets

(56) References Cited

U.S. PATENT DOCUMENTS

| | | | |
|---|---|---|---|
| 2019/0277463 A1 | 9/2019 | Santos et al. | |
| 2019/0293277 A1 | 9/2019 | Yamaguchi et al. | |
| 2020/0248898 A1* | 8/2020 | Chen ................... | F21V 23/0464 |
| 2021/0190279 A1 | 6/2021 | Fujii et al. | |
| 2022/0057049 A1* | 2/2022 | Hikmet ..................... | F21K 9/66 |
| 2022/0099278 A1 | 3/2022 | Koerner | |

* cited by examiner

LIGHTING ELEMENT

CROSS-REFERENCE TO RELATED APPLICATIONS

This application claims the benefit of U.S. Pat. App. No. 63/602,894, filed Nov. 27, 2023, the entirety of which is incorporated by reference herein.

BACKGROUND OF THE INVENTION

Field of the Invention

This invention pertains to a lighting element.

SUMMARY

One aspect of the disclosure is a lighting element configured to be mounted to a surface, such as a wall or ceiling. The lighting element comprises a base member, at least one forward member, and a plurality of solid-state light sources. The base member has a base member rear surface and a base member front surface. The base member rear surface is oriented such that the base member rear surface is in face-to-face relationship with the surface when the lighting element is mounted on the surface. The base member front surface is oriented such that the base member front surface faces away from the surface when the lighting element is mounted on the surface. The at least one forward member has a forward member front surface and a forward member rear surface. At least a portion of the forward member rear surface is spaced from and in face-to-face relationship with the base member front surface and defines a void between the portion of the forward member rear surface and the base member front surface. The forward member is of a material having a light transmission of 0% to 50%. The forward member comprises at least one opening extending from the forward member rear surface to the forward member front surface. The at least one opening has a first opening edge and a second opening edge. The opening has an opening width. The opening width is a transverse distance between the first and second opening edges. The plurality of solid-state light sources are each adapted to emit undiffused light. The plurality of solid-state light sources are within the void and spaced from the portion of the forward member rear surface such that the plurality of solid-state light sources are rearward and below the first and second opening edges when the lighting element is mounted on a wall. The plurality of solid-state light sources have a first diode and a second diode. The first and second diodes are transversely spaced from one another. The transverse spacing between the first and second diodes constitutes a diode transverse distance. The diode transverse distance is longer than the opening width. The plurality of solid-state light sources are positioned relative to the opening such that, if the lighting element is mounted on a flat, vertical wall with the lighting element being spaced a distance of between 2 feet and 10 feet below a flat, horizontal ceiling when the plurality of light sources are emitting light, the plurality of solid state light sources project beams of light through the opening and onto the flat, vertical wall and the flat, horizontal ceiling to create a light pattern on the flat, vertical wall and the flat, horizontal ceiling. The light pattern comprises a plurality of different intensities of light.

Another aspect of the disclosure is a lighting element comprising a forward member. The forward member comprises a non-wood material. The forward member has a forward member front surface. The forward member front surface has a front surface pattern. The front surface pattern has a plurality of ridges and valleys. The plurality of ridges and valleys are configured to have the appearance of wood.

Further features and advantages, as well as the operation, are described in detail below with reference to the accompanying drawings.

Figure 1:
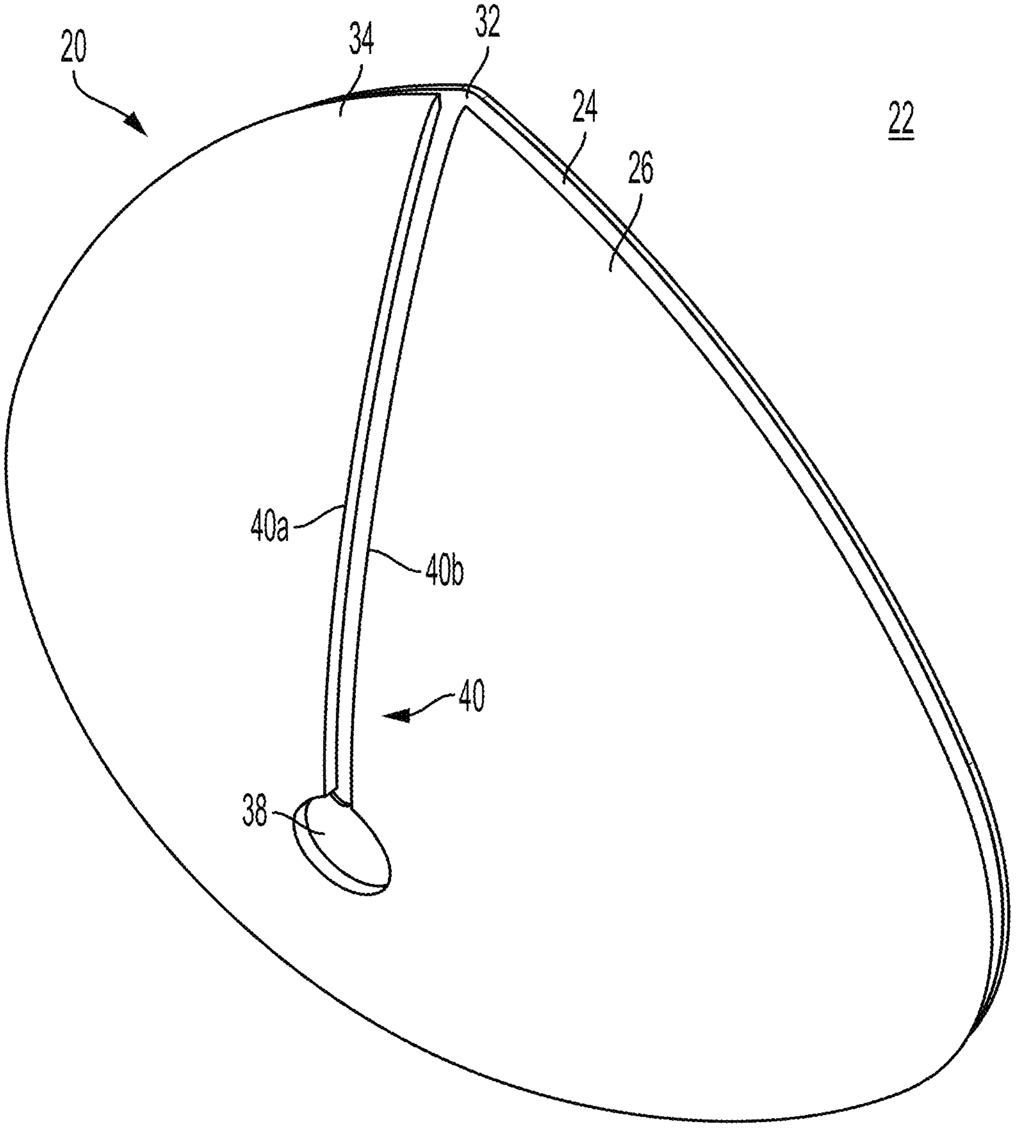
FIG. 1 is a perspective view of a lighting element.
Figure 2:
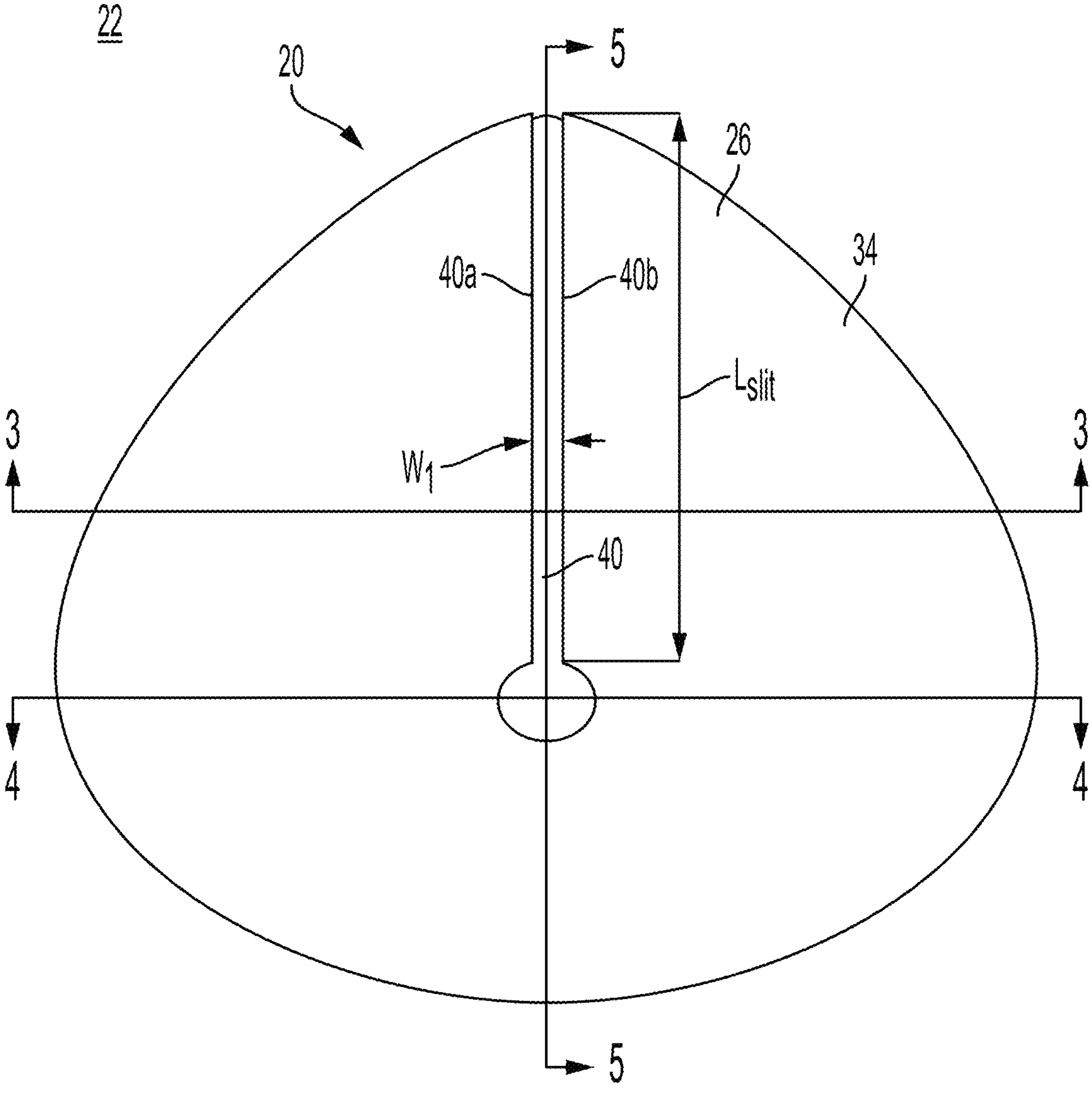
FIG. 2 is a front view of the lighting element of FIG. 1.

Reference numerals in the written specification and in the figures indicate corresponding items.

DETAILED DESCRIPTION

An embodiment of a lighting element in accordance with the present disclosure is indicated generally by reference number 20. The lighting element 20 is configured to be mounted to a surface 22, such as a wall or ceiling. The lighting element 20 comprises a base member 24, at least one forward member 26, and a plurality of solid state light sources 28.

The base member 24 has a base member rear surface 30 and a base member front surface 32. The base member rear surface 30 is oriented such that the base member rear surface is in face-to-face relationship with the surface 22 when the lighting element 20 is mounted on the surface. The base member front surface 32 is oriented such that the base member front surface faces away from the surface 22 when the lighting element is mounted on the surface.

The forward member 26 has a forward member front surface 34 and a forward member rear surface 36. The forward member has a forward member thickness $T_{fm}$ (see FIGS. 3, 5). The forward member thickness $T_{fm}$ is the distance from the forward member front surface 34 to the forward member rear surface 36. At least a portion of the forward member rear surface 36 is spaced from and in face-to-face relationship with the base member front surface 32 and defines a void 38 between the portion of the forward member rear surface and the base member front surface. The forward member 26 is of a material having a light transmission of 0% to 50%.

The forward member 26 includes a forward member peripheral edge 58. The forward member peripheral edge is spaced from the base member 24 such that, when the lighting element is mounted on a wall and the plurality of light sources 28 are emitting light, the lighting element creates an illuminated wall wash 60 on the wall around at least a portion of the lighting element.

Although the forward member 26 is shown as a domed teardrop shape, it is to be understood that the forward member could be of different shapes. For instance, the forward member 26 may be a domed shell having a forward member radius $R_{fm}$. The forward member radius $R_{fm}$ is the radius of the domed shell when viewed in a side-plan view. Alternatively, the forward member 26 could be hemispherical, cylindrical, rectangular, etc.

The forward member 26 comprises at least one opening 40 extending from the forward member rear surface 36 to the forward member front surface 34. The opening 40 has a first opening edge **40*a* and a second opening edge 40*b*. The opening 40 has an opening width $W_1$. The opening width $W_1$ is a transverse distance between the first and second opening edges 38*a*, 38*b***.

The opening 40 is an elongate slit 40 and has a slit length $L_{slit}$ at least ten times longer than the opening width $W_1$. The first opening edge **40*a* constitutes a first slit edge 40*a* and the second opening edge 40*b* constitutes a second slit edge 40*b***. The opening width $W_1$ is uniform along the slit length $L_{slit}$. It should be understood that alternative embodiments may have openings of varying shapes and sizes. For instance, the opening of another embodiment may have a width that varies along the slit length.

Figure 3:
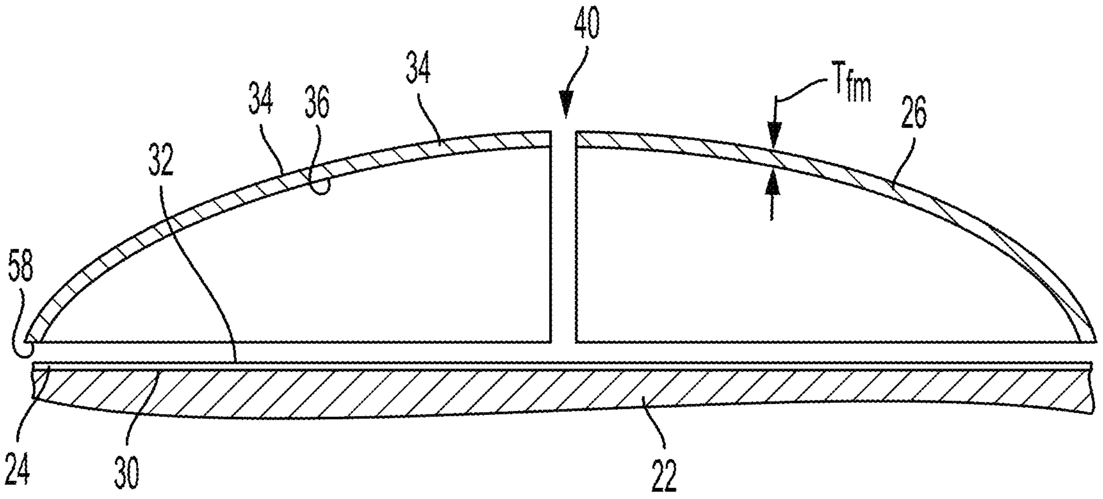
FIG. 3 is a section view of the lighting element of FIG. 1, taken along the line 3-3 of FIG. 2.
Figure 4:
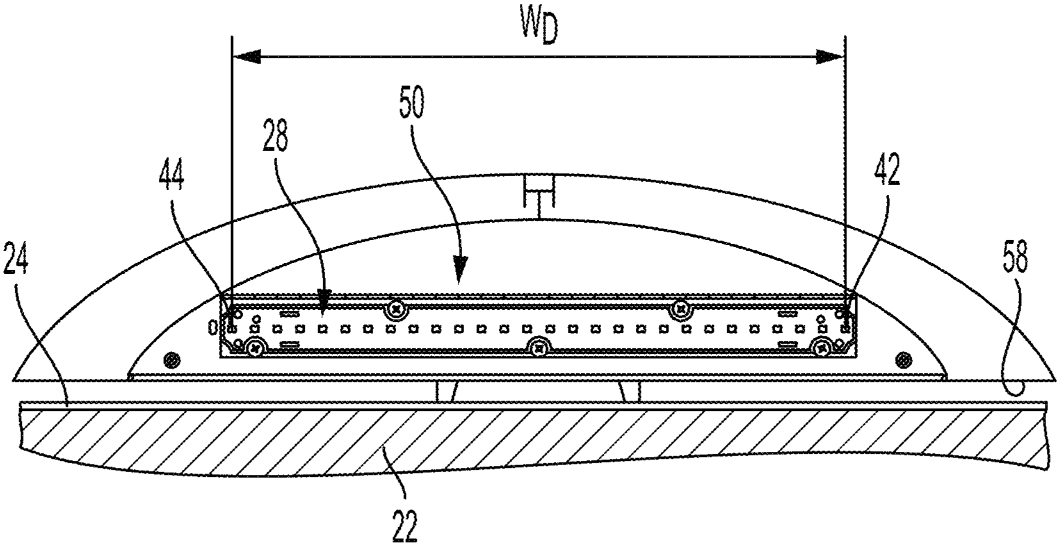
FIG. 4 is a section view of the lighting element of FIG. 1, taken along the line 4-4 of FIG. 2.
Figure 5:
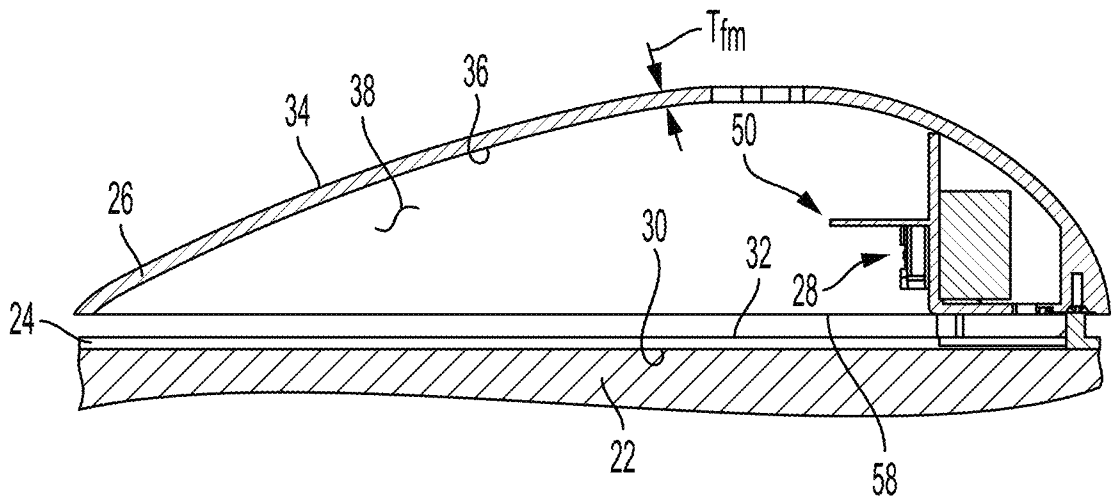
FIG. 5 is a section view of the lighting element of FIG. 1, taken along the line 5-5 of FIG. 2.
Figure 6:
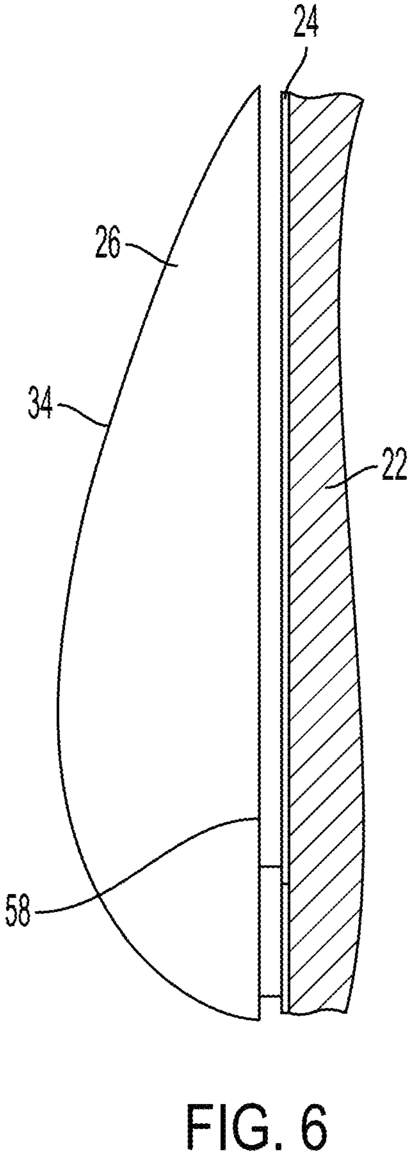
FIG. 6 is a right side view of the lighting element of FIG. 1.
Figure 7:
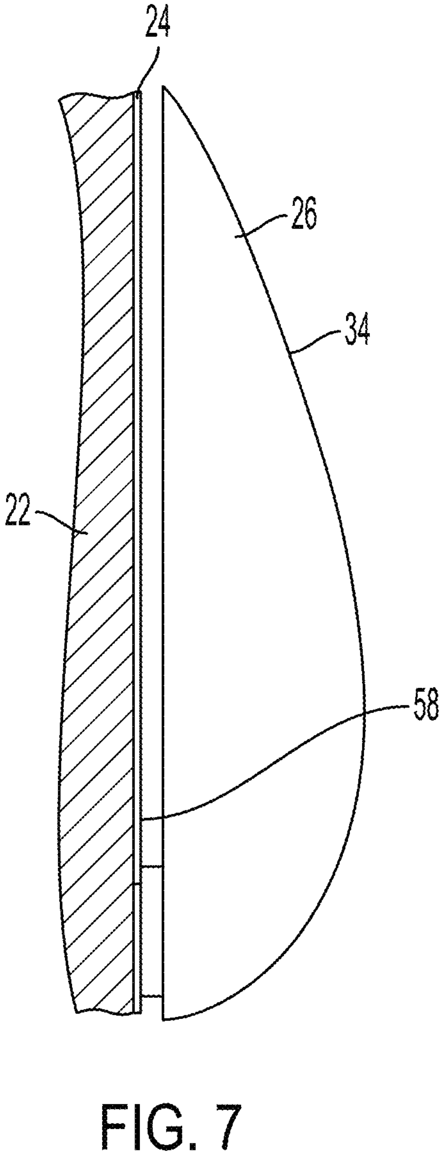
FIG. 7 is a left side view of the lighting element of FIG. 1.
Figure 8:
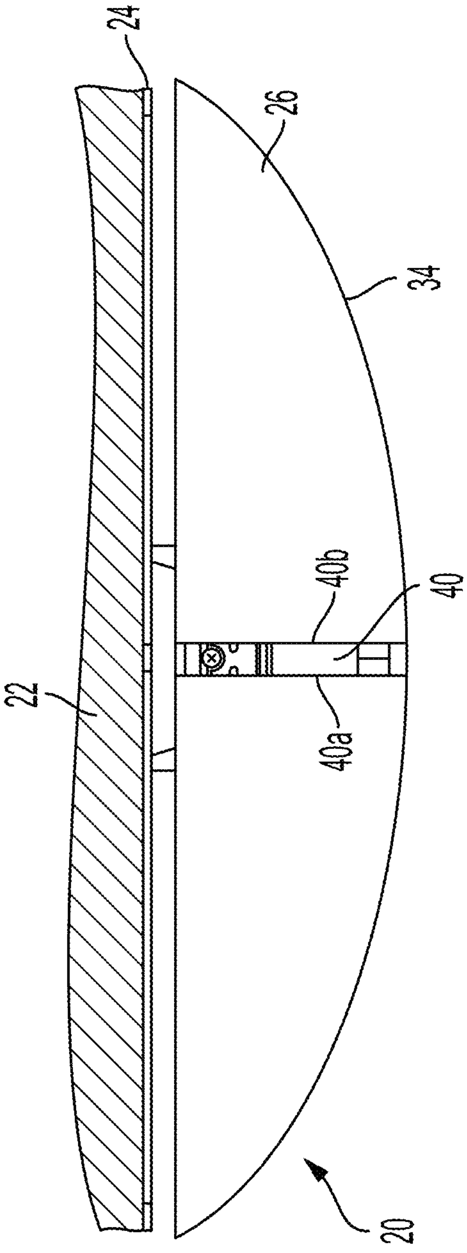
FIG. 8 is an end view of the lighting element of FIG. 1.
Figure 9:
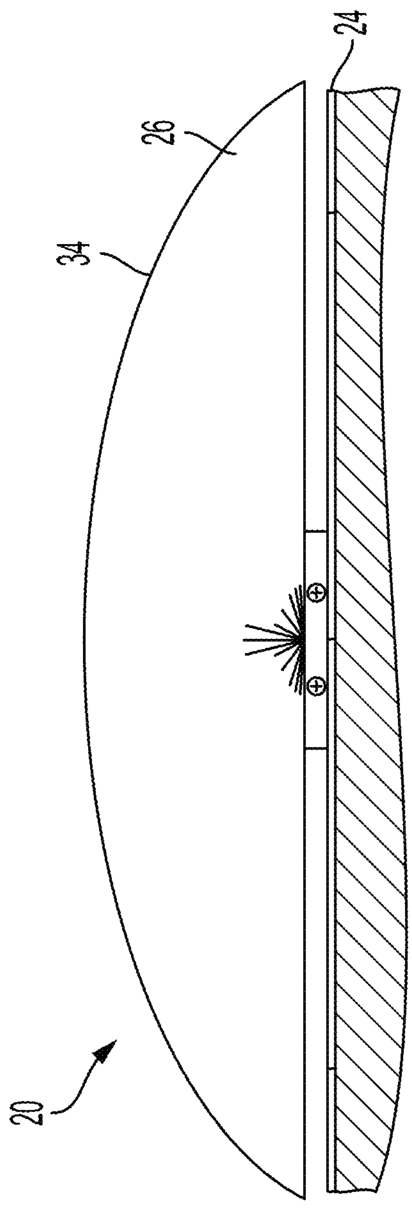
FIG. 9 is an opposite end view of the lighting element of FIG. 1.
Figure 10:
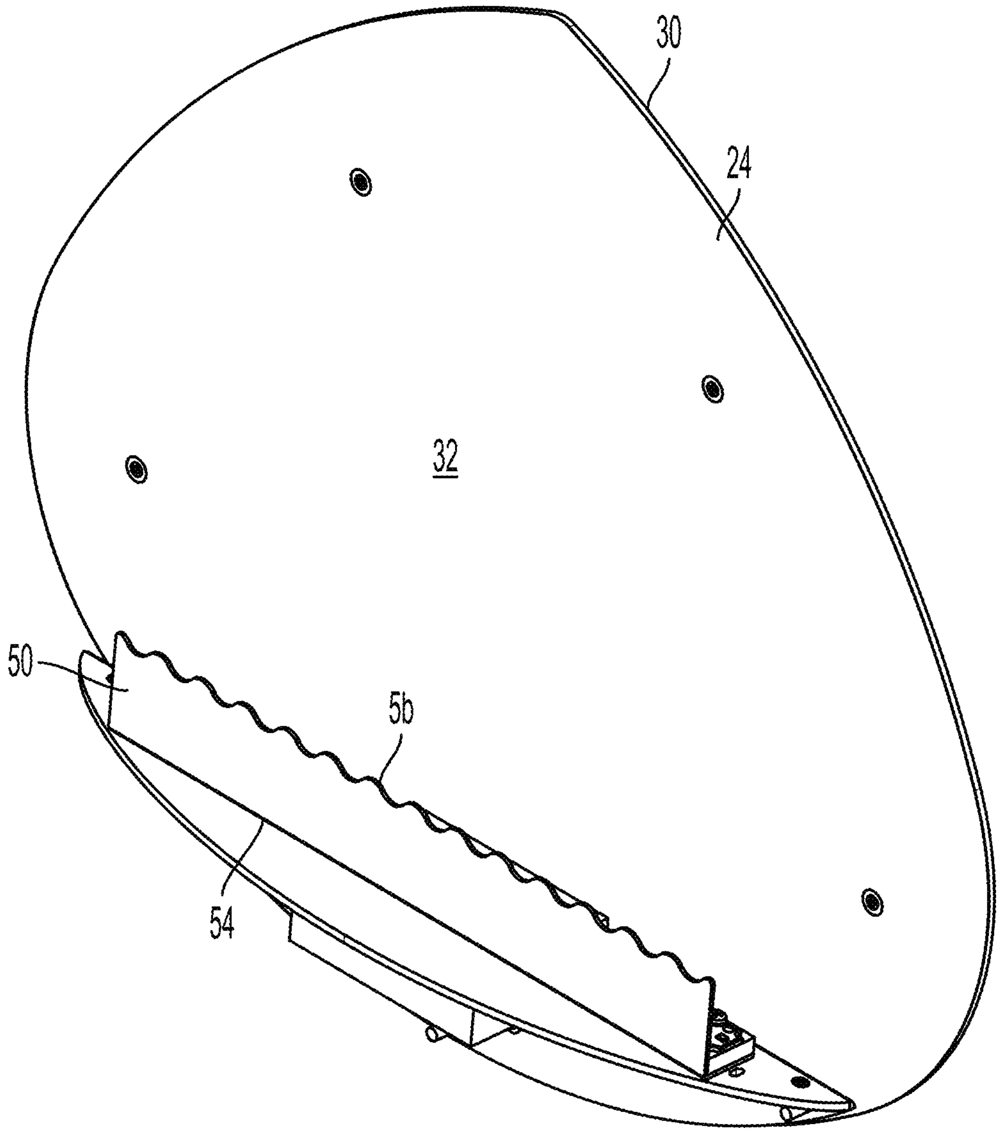
FIG. 10 is a perspective view of the lighting element of FIG. 1 with the forward member removed.
Figure 11:
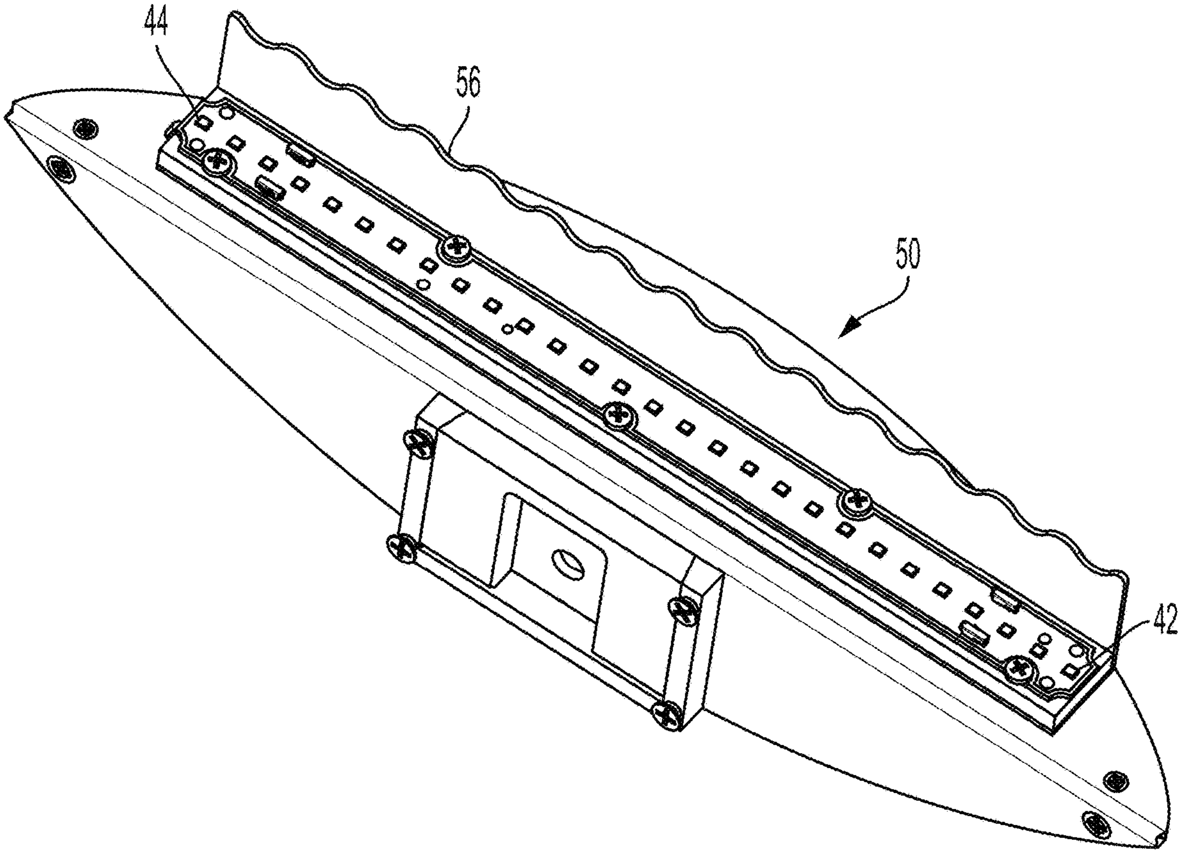
FIG. 11 is a rear perspective view of the lighting element of FIG. 1 with elements removed to show the blocking member and the plurality of solid-state light sources.

Similarly, the forward member thickness $T_{fm}$ shown in FIGS. 3 and 5 is uniform along the lengths of the first and/or second slit edges **40*a*, 40*b*. But, it should be understood that in other embodiments, the forward member thickness may vary along the lengths of the first and/or second slit edges. Additionally, in such alternative embodiments (e.g., FIGS. 13*b*, 13*c*), at least one of the first and second opening edges 40*a*, 40*b* may be an undulating curve. Likewise, the opening 40** may have a polygonal shape.

Figure 12:
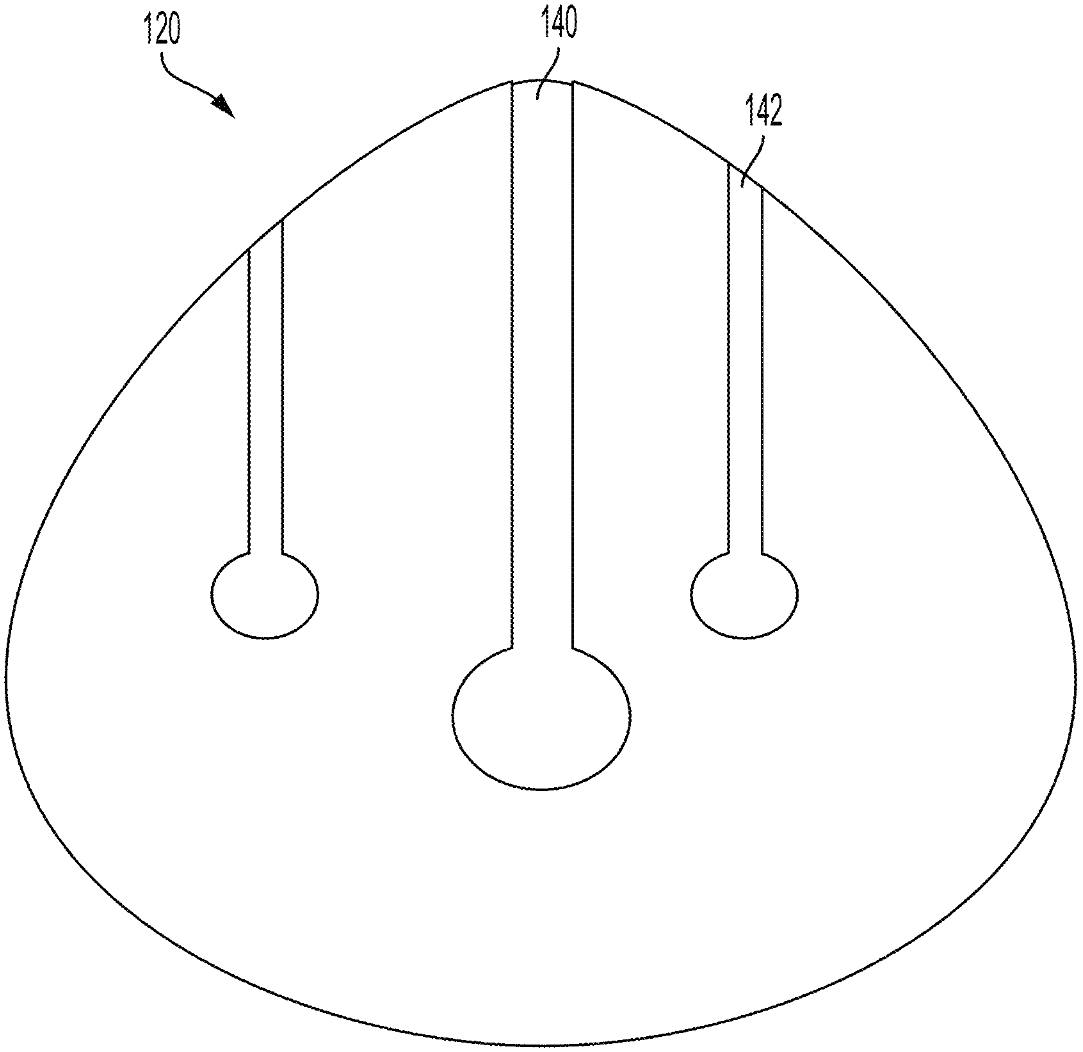
FIG. 12 is a front view of another embodiment of a lighting element.

FIG. 12 shows another light element embodiment 120, similar in all respects to the embodiment of FIGS. 1-11 except the embodiment of FIG. 12 includes first and second openings **140*a*, 140*b* instead of just one opening. The above discussion with respect to opening 40 applies equally to the first and second openings 140*a*, 140*b***.

Figure 13:
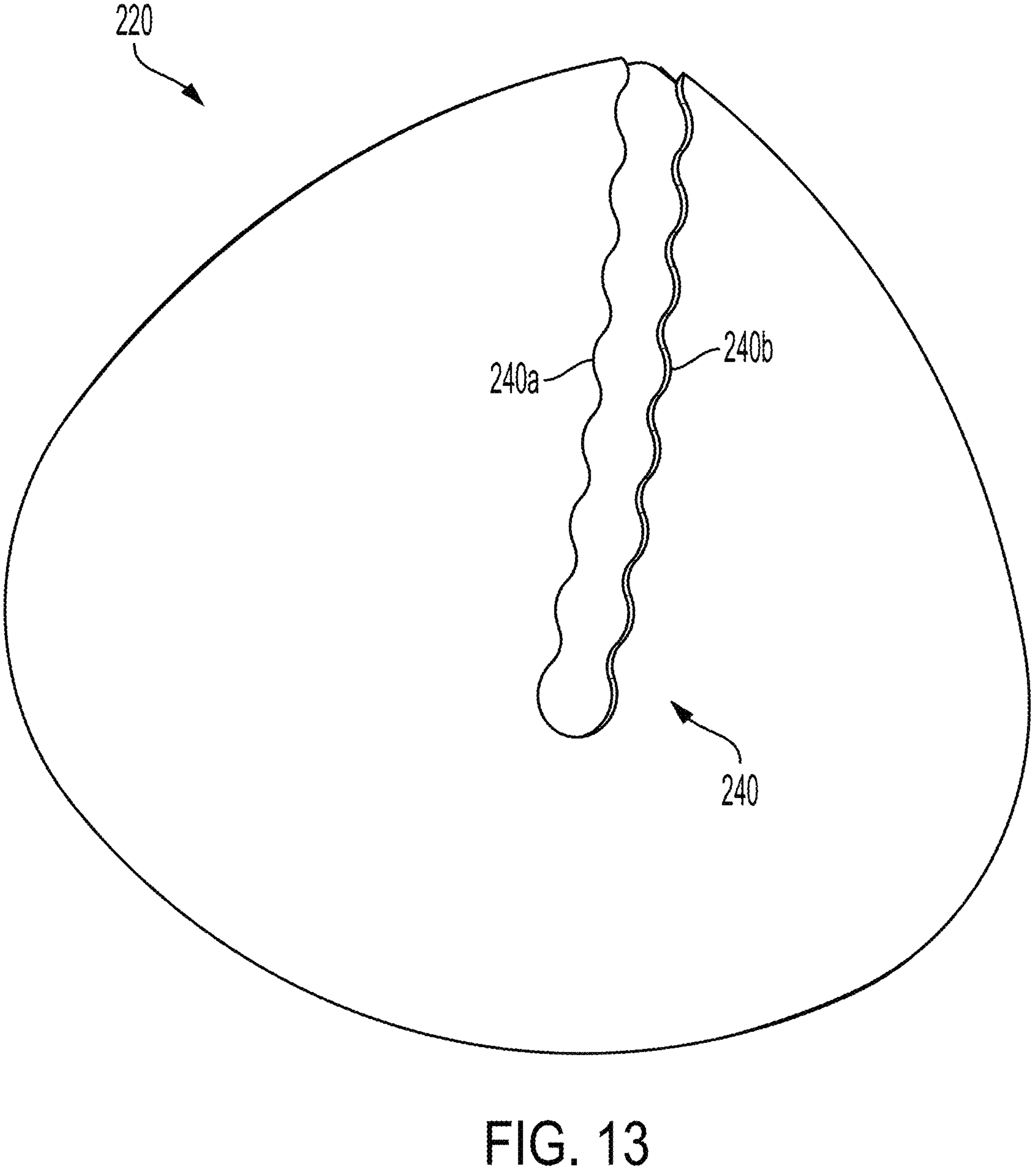
FIG. 13 is a perspective view of another embedment of a lighting element.

FIG. 13 shows another light embodiment 220, similar in all respects to the embodiment of FIGS. 1-11 except the embodiment of FIG. 13 has an opening 240 having edges **240*a*, 240*b*** that are scalloped/oscillating curves (e.g., sinusoidal).

Figure 14:
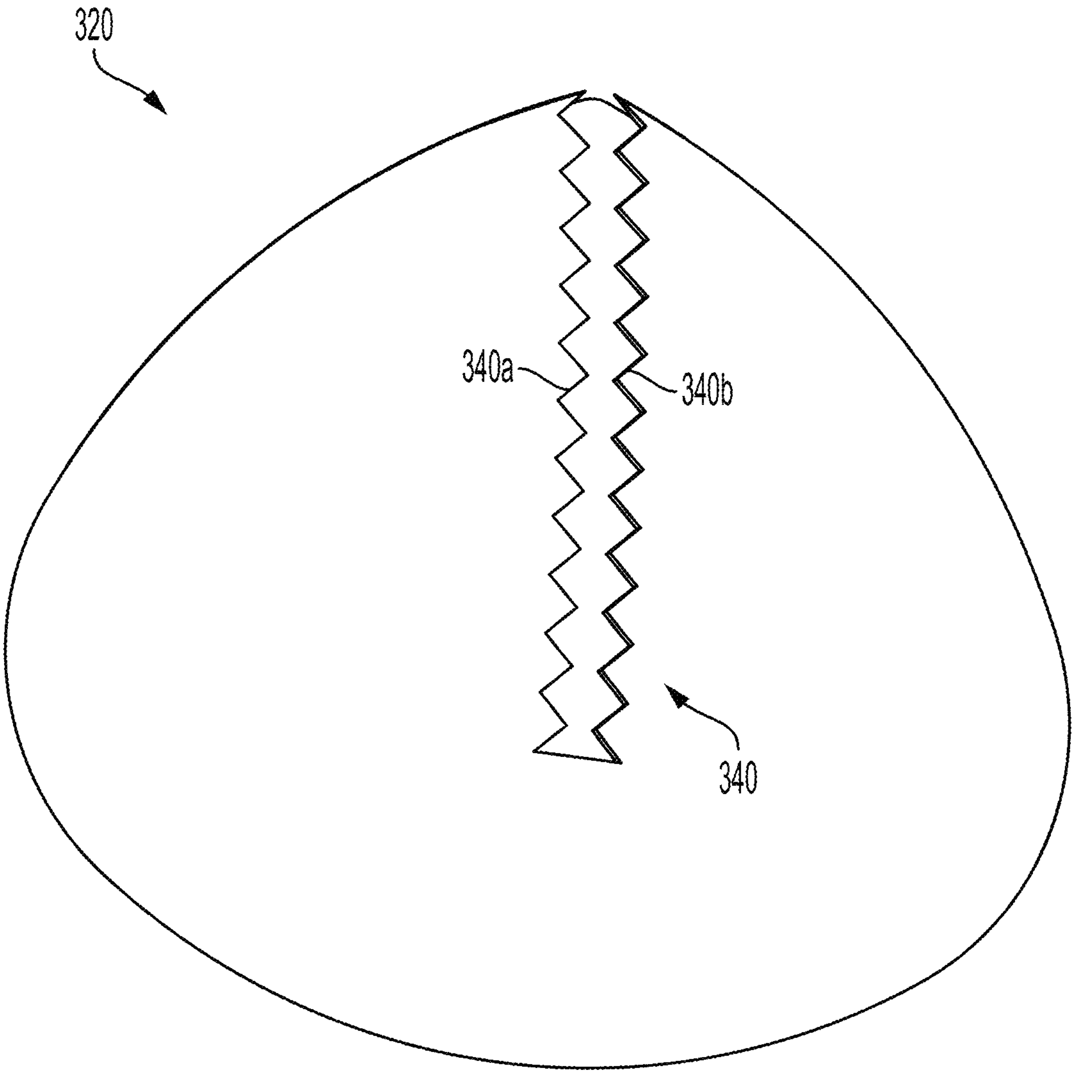
FIG. 14 is a perspective view of yet another embodiment of a lighting element.

FIG. 14 shows another light embodiment 320, similar in all respects to the embodiment of FIGS. 1-11 except the embodiment of FIG. 14 has an opening 340 having edges **340*a*, 340*b*** that are zig-zagged.

Referring again to FIGS. 1-11, the plurality of solid-state light sources 28 are each adapted to emit undiffused light. As used herein, the term "undiffused light" refers to light emitted by the solid-state light sources that is diffused not more than 10%. The plurality of solid-state light sources are within the void 38 and spaced from the forward member rear surface 36 such that the plurality of solid-state light sources 28 are rearward and below the first and second opening edges **40*a*, 40*b* when the lighting element 20 is mounted on a wall. The plurality of solid-state light sources 28 have a first diode 42 and a second diode 44. The first and second diodes 42, 44 are transversely spaced from one another. The transverse spacing between the first and second diodes 42, 44 constitutes a diode transverse distance $W_D$. The diode transverse distance $W_D$ is longer than the opening width $W_1$. The plurality of solid state light sources 28 are positioned relative to the opening 40 such that, if the lighting element 20 is mounted on a flat, vertical wall with the lighting element spaced a distance of between 2 feet and 10 feet below a flat, horizontal ceiling when the plurality of light sources are emitting light, the plurality of solid state light sources project beams of light 46 through the opening and onto the flat, vertical wall and the flat, horizontal ceiling to create a light pattern 48 on the flat, vertical wall and the flat, horizontal ceiling. The light pattern 48** comprises a plurality of different intensities of light.

Figure 15A:
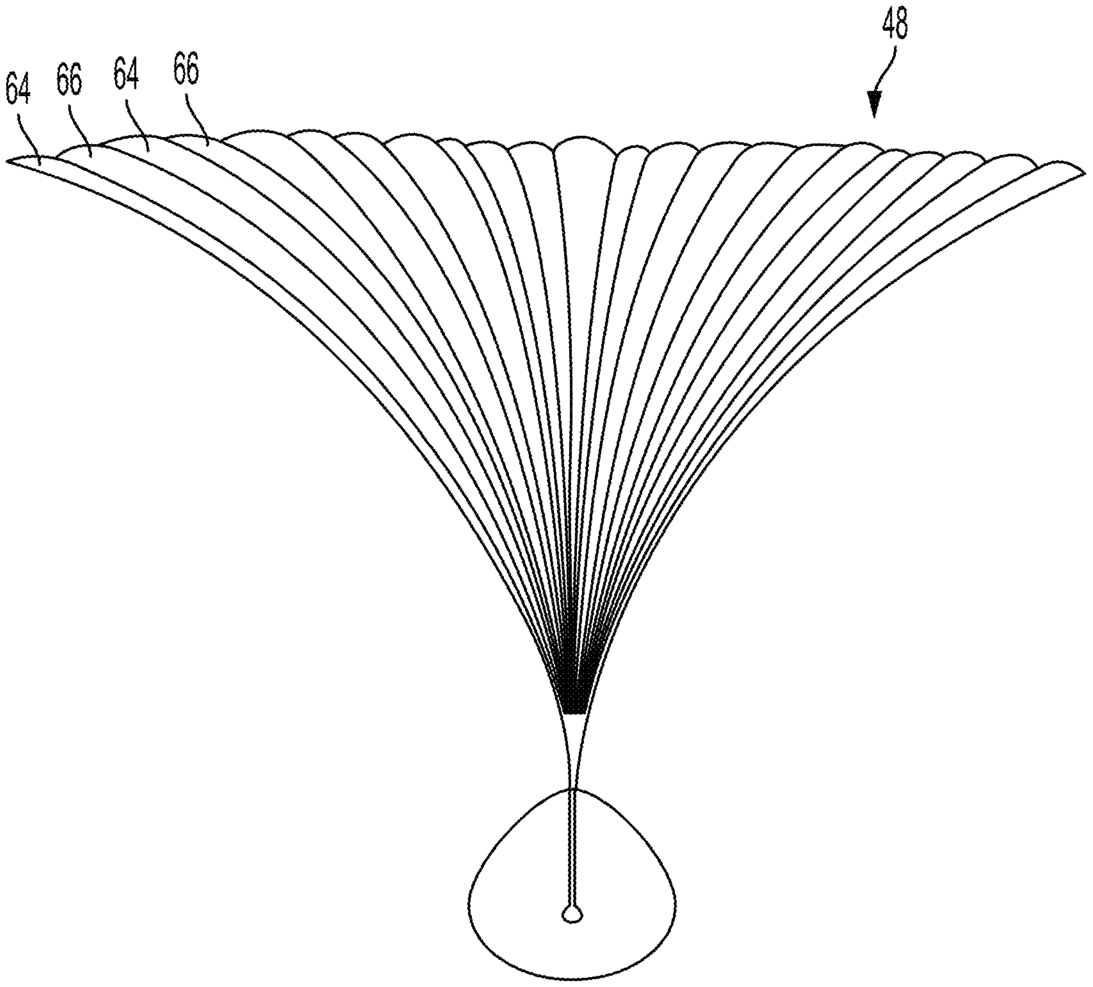
FIG. 15*a* is an exemplary view of a lighting pattern.
Figure 15B:
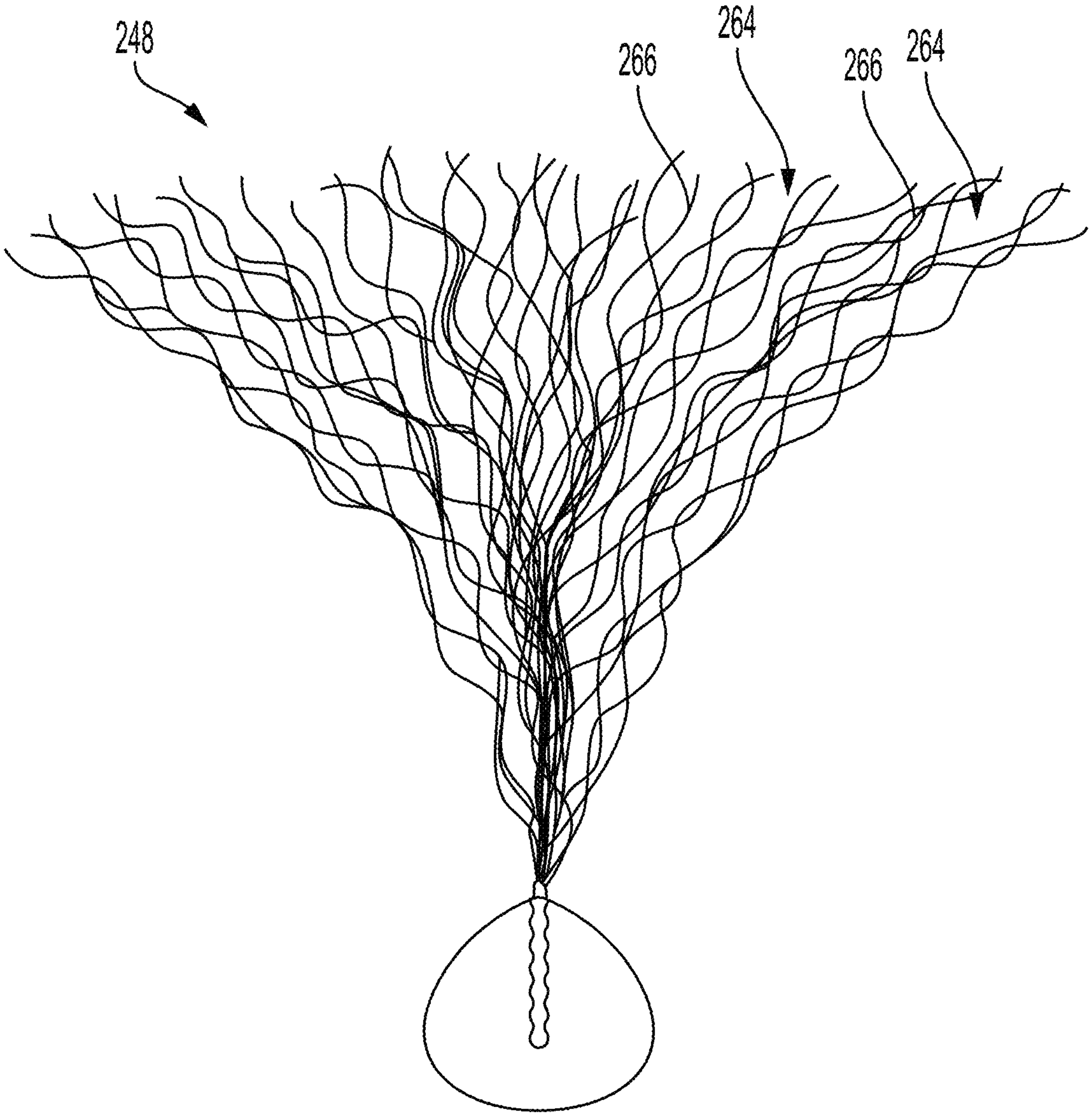
FIG. 15*b* is an exemplary view of another lighting pattern.
Figure 15C:
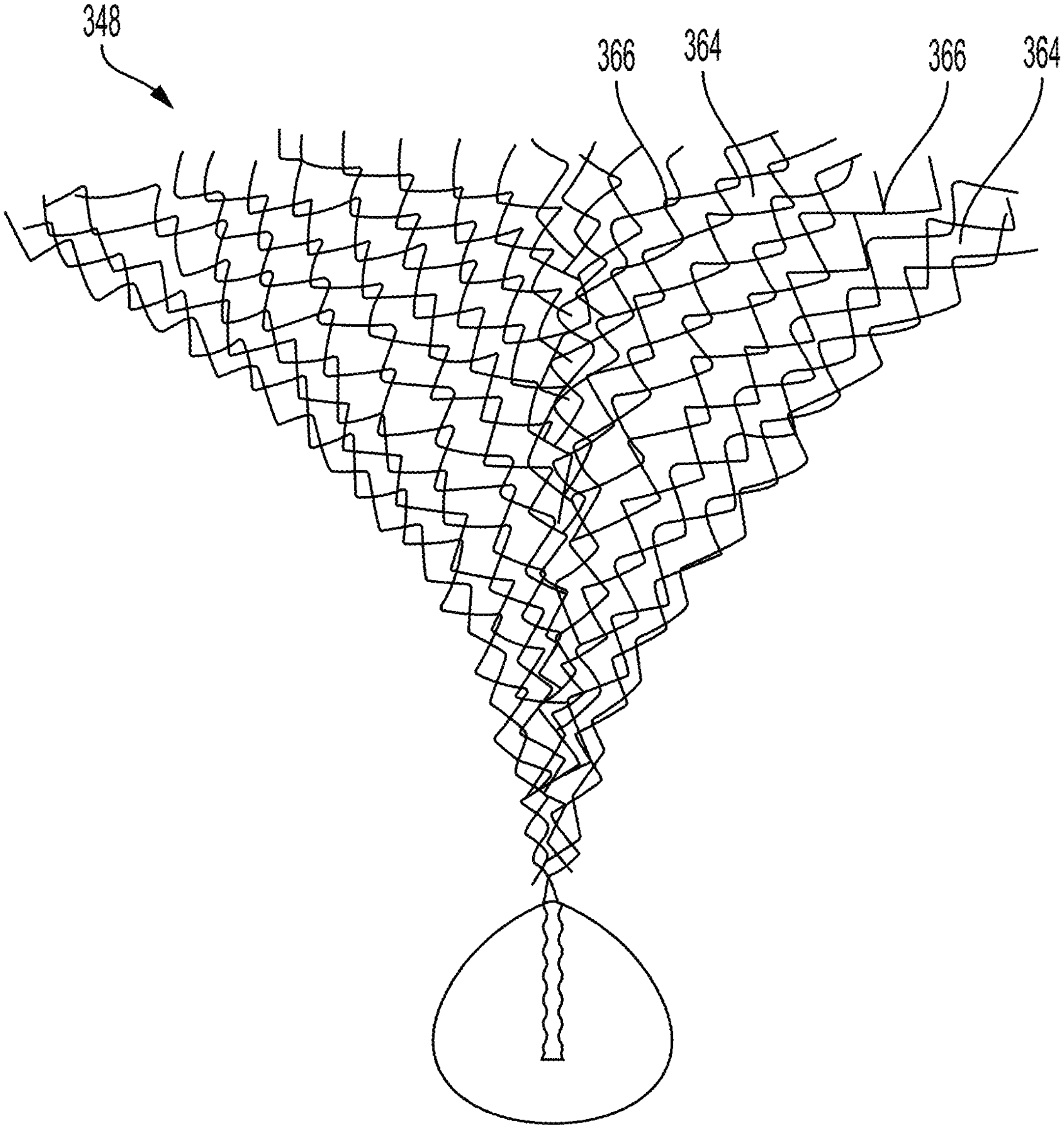
FIG. 15*c* is an exemplary view of yet another lighting pattern.

FIGS. **15*a*-15*c* show exemplar light patterns. The light pattern may comprise a plurality of first bands of light 64 and a plurality of second bands of light 66. The plurality of first bands of light 64 may be of a higher intensity than the plurality of second bands of light 66. In the embodiment of FIG. 15*a*, the light pattern 48 is produced from a lighting element as shown in the embodiment of FIGS. 1-9. The light pattern of FIG. 13*a* comprises alternating first and second bands of light 64, 66. Such an arrangement gives the appearance of alternating bands of light and shadow. In this embodiment, because the edges of the opening 40 are smooth, the edges of the bands of light are smooth. Because the forward member front and rear surfaces of this embodiment are curved, the edges of the bands of light are curved. In the embodiment of FIG. 15*b*, the light pattern 248 is produced from a lighting element as shown in the embodiment of FIG. 13. The light pattern of FIG. 15*b* comprises alternating first and second bands of light 264, 266. Such an arrangement gives the appearance of alternating bands of light and shadow. In this embodiment, because the edges are scalloped/oscillating curves (e.g., sinusoidal), the edges of the bands of light are correspondingly curved. Because the forward member front and rear surfaces of this embodiment are curved, the bands of light flare outwardly in a curve. In the embodiment of FIG. 15*c*, the light pattern 348 is produced form a lighting element as shown in the embodiment of FIG. 14. The light pattern of FIG. 15*c* comprises alternating first and second bands of light 364, 366. Such an arrangement gives the appearance of alternating bands of light and shadow. In this embodiment, because the edges are zig-zags, the edges of the bands of light are correspondingly zig-zagged and intersect one another at different locations as shown in FIG. 15*c***. Because the forward member front and rear surfaces of this embodiment are curved, the bands of light flare outwardly in a curve.

Alternatively, if the opening has some other geometric shape (e.g., round), the pattern may comprise alternating first and second bands of light 64, 66 having a shape corresponding to the geometric shape. Likewise, if the lighting element constitutes multiple openings having different geometric shapes, the pattern may comprise portions of higher and lower intensity light corresponding to the various shapes of the openings. It is to be understood that the shape of light pattern is dependent on several factors, including the shape and number of the opening(s), the orientation of the diodes to the opening(s), the spacing of the diodes, and the shape of the diode array (e.g., straight or curved). It is also to be understood that the shape of an edge at an opening at a forward member front surface may be the same as or different from the shape of the edge at the forward member rear surface. Additionally, the forward member front and/or rear surfaces may be planar, curved, or some other shape in the vicinity of the opening.

The plurality of solid-state light sources 28 may be semiconductor light-emitting diodes (LEDs), organic light-emitting diodes (OLEDs), or polymer light-emitting diodes (PLEDs). If the lighting element comprises LEDs, the LEDs may be color-tunable and/or RGB. The plurality of solid-state light source may comprise an array of at least five diodes. The array of diodes may have an array density of not more than 8 diodes per inch. Each diode in the array of diodes may be spaced from adjacent diodes in the array, and such spacing may be uniform for each diode in the array. The spacing between adjacent diodes may be a distance less than, equal to, or greater than the opening width $W_1$.

Where the plurality of solid-state light sources 28 comprise RGB LEDs, the first and second pluralities of alternating bands of light 64, 66 may have portions having different colors. Similarly, the color of particular LEDs in the plurality of solid-state light sources 28 may be selected in order to cause certain bands of the first and second pluralities of alternating bands of light 64, 66 to have a particular hue in addition to an intensity. By altering the color of particular LEDs of the plurality of solid-state light sources 28, color may be integrated into the pattern 48.

The lighting element 20 may further comprise a blocking member 50. The blocking member is adapted and configured to create a termination edge 52 on the pattern 48 such that the pattern terminates uniformly on the ceiling. The blocking member 50 has a rear edge 54 adjacent the forward member 26 and a forward edge 56 spaced from the rear edge. The forward edge may have various shapes. For instance, it may be an undulating or sinusoidal curve.

The lighting element 20 may comprise a non-wood material. For example, the forward member may comprise a cast material formed in a casting process (e.g., metal, glass, resin, resin impregnated with metal flakes, composite materials such as carbon fiber, etc.). The forward member may alternatively be formed in additive manufacturing processes (e.g., various methods of 3D printing) or by traditional subtractive manufacturing process (e.g., a milling machine). The forward member may also be formed by a hydroforming process. The forward member front surface 34 may have a forward member front surface pattern $P_{fs}$. The forward member front surface pattern $P_{fs}$ may have a plurality of ridges and valleys 62, and the plurality of ridges and valleys may be configured to have the appearance of wood.

More particularly, the plurality of ridges and valleys may have the appearance of wood that has been media blasted. Natural wood comprises rings, which have portions that are softer (typically early season growth) and portions that are harder (typically late season growth). Accordingly, when natural wood is blasted with media (e.g., sand, aluminum oxide, crushed glass, glass beads, plastic media, silicon carbide, pumice, steel shot, steel grit, organic compounds, etc.), the wood wears nonuniformly because the softer portions of the rings wears at a greater rate than the harder portions of the rings. This creates valleys where the softer portions are located and ridges where the harder portions are located. This emphasizes the graining of the wood.

The plurality of ridges and valleys of the surface pattern $P_{fs}$ mimic this look and create the impression of metal having the appearance of wood. This appearance is different from a surface (e.g., a metal surface) to which a 2 dimensional pattern applied (which may or may not include coloring to be similar to wood) or which has had a wood veneer applied because it includes a 3 dimensional aspect that better reflects the appearance of media blasted wood. The impression of the surface pattern $P_{fs}$ is that of metal with a surface having an organic wooden pattern.

The surface pattern $P_{fs}$ may be created by forming a piece of wood into the shape of the forward member 24, media blasting the piece of wood to create a surface pattern on the piece of wood having a plurality of ridges and valleys, and them making a metal casting from the piece of wood such that the resulting casting has the surface pattern $P_{fs}$ with a plurality of ridges and valleys 62 resembling those of the piece of wood. It should be understood that any claims directed to the lighting element are not limited by this method of manufacture unless explicitly stated in the claims.

In view of the foregoing, it should be appreciated that the invention has several advantages over the prior art.

It should also be understood that when introducing elements of the present invention in the claims or in the above description of exemplary embodiments of the invention, the terms "comprising," "including," and "having" are intended to be open-ended and mean that there may be additional elements other than the listed elements. Additionally, the term "portion" should be construed as meaning some or all of the item or element that it qualifies. Moreover, use of identifiers such as first, second, and third should not be construed in a manner imposing any relative position or time sequence between limitations.

As various modifications could be made in the constructions and methods herein described and illustrated without departing from the scope of the invention, it is intended that all matter contained in the foregoing description or shown in the accompanying drawings shall be interpreted as illustrative rather than limiting. Thus, the breadth and scope of the present invention should not be limited by any of the above-described exemplary embodiments, but should be defined only in accordance with the following claims appended hereto and their equivalents.

What is claimed is:

1. A lighting element configured to be mounted to a surface, such as a wall or ceiling, the lighting element comprising:

a base member having a base member rear surface and a base member front surface, the base member rear surface being oriented such that the base member rear surface is in face-to-face relationship with the surface when the lighting element is mounted on the surface, the base member front surface being oriented such that the base member front surface faces away from the surface when the lighting element is mounted on the surface;

at least one forward member having a forward member front surface and a forward member rear surface, at least a portion of the forward member rear surface being spaced from and in face-to-face relationship with the base member front surface and defining a void between the portion of the forward member rear surface and the base member front surface, the forward member being of a material having a light transmission of 0% to 50%, the forward member comprising at least one opening extending from the forward member rear surface to the forward member front surface, the at least one opening having a first opening edge and a second opening edge, and wherein the opening has an opening width, the opening width being a transverse distance between the first and second opening edges;

a plurality of solid-state light sources, the plurality of solid-state light sources each adapted to emit undiffused light, the plurality of solid-state light sources being within the void and spaced from the portion of the forward member rear surface such that the plurality of solid-state light sources are rearward and below the first and second opening edges when the lighting element is mounted on a wall, the plurality of solid-state light sources having a first diode and a second diode, the first and second diodes being transversely spaced from one another, the transverse spacing between the first and second diodes constituting a diode transverse distance, the diode transverse distance being longer than the opening width, the plurality of solid-state light sources being positioned relative to the opening such that, if the lighting element is mounted on a flat, vertical wall with the lighting element being spaced a distance of between 2 feet and 10 feet below a flat, horizontal ceiling when the plurality of light sources are emitting light, the plurality of solid state light sources project beams of light through the opening and onto the flat, vertical wall and the flat, horizontal ceiling to create a light pattern on the flat, vertical wall and the flat, horizontal ceiling, the light pattern comprising a plurality of different intensities of light;

a blocking member, the blocking member being adapted and configured to create a termination edge on the pattern such that the pattern terminates uniformly on the ceiling.

2. The lighting element of claim 1 wherein the opening is an elongate slit, the elongate slit having a slit length at least 10 times longer than the opening width, the first opening edge constituting a first slit edge, the second opening edge constituting a second slit edge, the forward member having a forward member thickness, the forward member thickness being a distance from the forward member front surface to the forward member rear surface.

3. The lighting element of claim 1 wherein the opening has a polygonal shape.

4. A lighting element configured to be mounted to a surface, such as a wall or ceiling, the lighting element comprising:

a base member having a base member rear surface and a base member front surface, the base member rear surface being oriented such that the base member rear surface is in face-to-face relationship with the surface when the lighting element is mounted on the surface, the base member front surface being oriented such that the base member front surface faces away from the surface when the lighting element is mounted on the surface;

at least one forward member having a forward member front surface and a forward member rear surface, at least a portion of the forward member rear surface being spaced from and in face-to-face relationship with the base member front surface and defining a void between the portion of the forward member rear surface and the base member front surface, the forward member being of a material having a light transmission of 0% to 50%, the forward member comprising at least one opening extending from the forward member rear surface to the forward member front surface, the at least one opening having a first opening edge and a second opening edge, and wherein the opening has an opening width, the opening width being a transverse distance between the first and second opening edges;

a plurality of solid-state light sources, the plurality of solid-state light sources each adapted to emit undiffused light, the plurality of solid-state light sources being within the void and spaced from the portion of the forward member rear surface such that the plurality of solid-state light sources are rearward and below the first and second opening edges when the lighting element is mounted on a wall, the plurality of solid-state light sources having a first diode and a second diode, the first and second diodes being transversely spaced from one another, the transverse spacing between the first and second diodes constituting a diode transverse distance, the diode transverse distance being longer than the opening width, the plurality of solid-state light sources being positioned relative to the opening such that, if the lighting element is mounted on a flat, vertical wall with the lighting element being spaced a distance of between 2 feet and 10 feet below a flat, horizontal ceiling when the plurality of light sources are emitting light, the plurality of solid state light sources project beams of light through the opening and onto the flat, vertical wall and the flat, horizontal ceiling to create a light pattern on the flat, vertical wall and the flat, horizontal ceiling, the light pattern comprising a plurality of different intensities of light;

wherein the forward member has a forward member peripheral edge, the forward member peripheral edge being spaced from the base member front surface such that, when the plurality of light sources are emitting light, the lighting element creates an illuminated wall wash on the wall around at least a portion of the lighting element.

5. The lighting element of claim 1, wherein the at least one forward member comprises a non-wood material such that the forward member front surface is of the non-wood material, the forward member front surface having a front surface pattern, the front surface pattern having a plurality of ridges and valleys, the plurality of ridges and valleys being configured to have the appearance of wood that has been abraded in a media blasting process.

6. The lighting element of claim 2 wherein at least one of the first and second opening edges is an undulating curve.

7. The lighting element of claim 2 wherein the opening width is uniform along the slit length.

8. The lighting element of claim 2 wherein the forward member thickness at the first slit edge is uniform along the slit length, and wherein the forward member thickness at the second slit edge is uniform along the slit length.

9. The lighting element of claim 2 wherein the forward member thickness at the first slit edge varies along the slit length, and wherein the forward member thickness at the second slit edge varies along the slit length.

10. The lighting element of claim 2 wherein the opening width varies along the slit length.

11. The lighting element of claim 1 wherein the blocking member has a rear edge adjacent the forward member and a forward edge spaced from the rear edge, the forward edge being an undulating curve.

12. The lighting element of claim 1 wherein the forward edge is a sinusoidal curve.

13. The lighting element of claim 4 wherein the plurality of solid-state light sources comprises at least 5 diodes.

14. The lighting element of claim 4 wherein each adjacent pair of diodes of the plurality of solid-state light sources is spaced a distance less than the opening width.

15. The lighting element of claim 4 wherein each adjacent pair of diodes of the plurality of solid-state light sources is spaced a distance equal to or greater than the opening width.

16. The lighting element of claim 4 wherein the first and second diodes are semiconductor light-emitting diodes (LEDs).

17. The lighting element of claim 4 wherein the first and second diodes are organic light-emitting diodes (OLEDs).

18. The lighting element of claim 4 wherein the first and second diodes are polymer light-emitting diodes (PLEDs).

19. The lighting element of claim 4 wherein the forward member is a domed shell having a forward member radius, the forward member radius being the radius of the domed shell when viewed in a side-plan view.

20. The lighting element of claim 4 wherein the at least one opening constitutes a first opening, the lighting element further comprising a second opening, the second opening extending from the forward member rear surface to the forward member front surface.

21. The lighting element of claim 4 wherein at least one of the first and second opening edges is an undulating curve.

22. The lighting element of claim 4 further comprising a blocking member, the blocking member being adapted and configured to create a termination edge on the pattern such that the pattern terminates uniformly on the ceiling.

23. The lighting element of claim 22 wherein the blocking member has a rear edge adjacent the forward member and a forward edge spaced from the rear edge, the forward edge being an undulating curve.

24. The lighting element of claim 23 wherein the forward edge is a sinusoidal curve.

25. The lighting element of claim 4, wherein the at least one forward member comprises a non-wood material such that the forward member front surface is of the non-wood material, the forward member front surface having a front surface pattern, the front surface pattern having a plurality of ridges and valleys, the plurality of ridges and valleys being configured to have the appearance of wood that has been abraded in a media blasting process.

26. The lighting element of claim of claim 13 wherein the array of LEDs has an array density of not more than 8 diodes per inch.

27. The lighting element of claim 26 wherein each diode in the array of LEDs is spaced from adjacent diodes in the array, and wherein the spacing between adjacent diodes is uniform.

28. The lighting element of claim 16 wherein the LEDs are color tunable.

29. The lighting element of claim 16 wherein the LEDs are RGB LEDs.

30. The lighting element of claim 16 wherein the RGB LEDs are color tunable.

* * * * *